United States Patent Office 3,072,843
Patented Jan. 8, 1963

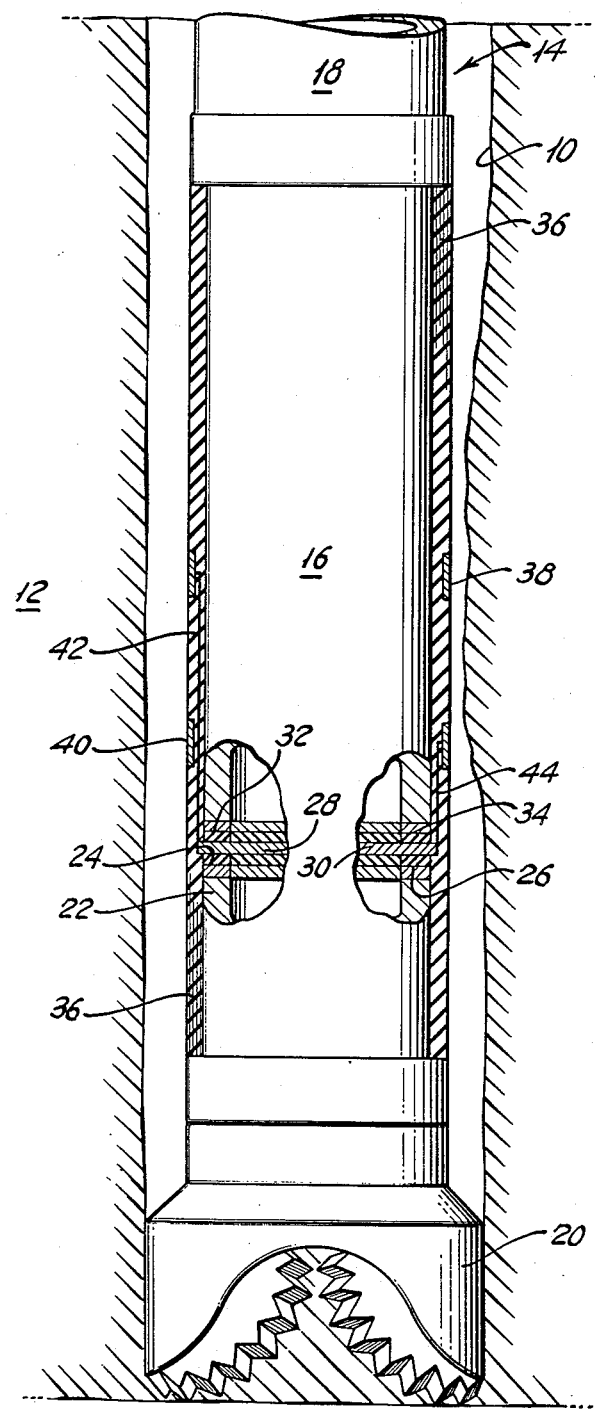

3,072,843
ABRASION RESISTANT COATING SUITABLE FOR BOREHOLE DRILLING APPARATUS
Roy J. Clements and Roland B. Stelzer, Bellaire, Tex., assignors to Texaco Inc., a corporation of Delaware
Filed Aug. 13, 1957, Ser. No. 677,994
15 Claims. (Cl. 324—10)

This invention relates to an abrasion resistant coating and more particularly to an abrasion resistant insulation coating suitable for borehole logging while drilling apparatus.

In the conventional method of electrically logging a borehole the log is obtained while the drilling operation is periodically interrupted, during which period the drill pipe is removed, and an electrical logging tool or sonde, suspended by a steel shrouded multiconductor electrical cable, is lowered into the borehole. As the instrument passes through the geological strata information in the form of electrical signals is transmitter from the borehole to the surface through the conductor cable where it is recorded on a chart.

There are several disadvantages in using the conventional electrical logging method, for example, it is time consuming, the log is made after the drilling fluid in the borehole invades the formation and the method lacks depth control since the log may be made after the drilling apparatus has penetrated a considerable distance beyond the desired strata.

It has been found that many of these disadvantages may be eliminated or mitigated by simultaneously logging and drilling the borehole as disclosed and claimed in a copending application D. #43,258 of R. J. Clements, B. D. Lee and R. B. Stelzer, entitled "Geophysical Prospecting Apparatus," and now abandoned. To provide an electrical or resistivity log at least two electrodes must be electrically connected to two spaced points in the earth's formations. One of the electrodes may conveniently be the drill stem of the drilling apparatus and therefore at least one additional electrode must be insulated from the drill stem.

It can readily be seen that when a resistivity log of a borehole is being produced simultaneously with the well or borehole drilling operation, that is, at a time when the metallic drill stem is in the borehole, careful consideration must be given to the insulation between the electrode or electrodes and the metallic drill stem. A layer of insulation which can withstand high temperatures and shock must be applied to the drill stem, it must be of high electrical resistance to avoid excessive leakage between the drill stem and the one or more additional electrodes and, since it comes into contact with rough, hard formation particles and circulating abrasive drilling mud slurries, it must be highly abrasion resistant to avoid the necessity of frequently reapplying the insulation on the outer surface of the drill stem.

In accordance with this invention a new composition of matter which is suitable as an abrasion resistant coating for oil production apparatus has been provided which includes a polymerized epoxy resin matrix prepared from glycidyl polyether incorporating powdered silicon carbide or Carborundum in relative proportions of 60 to 400 parts by weight silicon carbide per 100 parts by weight epoxy resin, the particle size of the silicon carbide being in the range from 20 to 325 mesh, Tyler standard screen scale.

Glycidyl polyethers are obtainable, as is well known, from reaction of epichlorhydrin and polyhydric phenols or alcohols in an alkaline medium. There is preferably used glycidyl polyether of a polyhydric phenol, including pyrogallol and phloroglucinol, but particularly of a dihydric phenol. Such polyethers are obtained by heating the dihydric phenol with epichlorhydrin at about 50° C. to 150° C. using 1 to 2 or more mols of epichlorhydrin per mol of dihydric phenol. Also present is a base, such as sodium or potassium hydroxide in slight stoichiometric excess to the epichlorhydrin, i.e., about 2 percent to 30 percent. The heating is continued for several hours to effect the reaction and the product is then washed free of salt and base. The product, instead of being a simple compound, is generally a complex mixture of glycidyl polyethers, but the principal product may be represented by the formula:

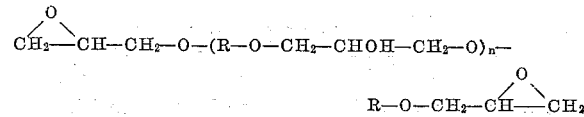

wherein $n$ is an integer of the series 0, 1, 2, 3 . . ., preferably 0 to 10, and R represents the divalent hydrocarbon radical of the dihydric phenol. Although the polyether is a substance primarily of the above formula, it may contain some material with one or both of the terminal glycidyl radicals in hydrated form. For a more complete description of epoxy resins reference may be had to U.S. Patent No. 2,642,412.

In a more specific aspect of this invention an abrasion resistant insulation coating for the external surface of a pipe of the drill stem of borehole logging apparatus has been provided by using a wet lay-up process wherein a reinforcing material or carrier, preferably glass cloth or fiber, is wrapped and bonded with a resin mixture which includes approximately 100 parts by weight epoxy resin, 25 parts by weight curing agent, and 125 parts by weight Carborundum filler.

In order that the invention may be more clearly understood and carried into effect it will now be described more fully with reference to the accompanying drawing in which the FIGURE illustrates the lower portion of a rotary drill stem including the electrode assembly of logging while drilling apparatus.

Referring to the drawing in more detail there is shown in a borehole 10 traversing subsurface formations of the earth 12 the lower portion of a drill stem or string 14 including an electrode assembly 16 of an electrical logging system, not shown, which system may be disposed within the drill stem 14 or at the surface of the earth 12, a conventional drill collar 18 which is connected to the upper end of the electrode assembly 16 and a conventional drill bit 20 which is connected to the lower end of the electrode assembly 16. The electrode assembly 16 comprises a metallic pipe 22 having a passage therethrough of sufficient cross-sectional area to conduct drill fluids or mud during conventional rotary drilling operations and having strength sufficient to withstand the stresses encountered during normal drilling operations. The wall of the pipe 22 has two small openings 24 and 26 in which are inserted the feed-through rods 28 and 30 which are insulated and bonded in place with a mixture comprising 100 parts by weight epoxy resin, 40 parts by weight asbestos powder and 14½ parts by weight of a curing agent, preferably metaphenylene diamine, forming insulating sleeves 32 and 34. Applied to the external surface of the pipe 22 is a layer of insulation 36, preferably about ⅜ inch thick, comprising glass cloth wrapped and bonded with a resin mixture comprising 100 parts by weight polymerized epoxy resin matrix incorporating 60 to 400 parts by weight silicon carbide or Carborundum filler. A layer of insulation which has been successfully used in logging while drilling apparatus comprised glass cloth having a thickness of 11 mils, a count of 57 by 54 and a weight of 9.07 ounces per square yard wrapped and bonded with 100 parts by weight of epoxy resin having generally the chemical structure

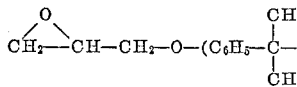 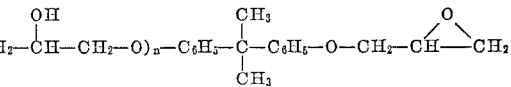

and having a molecular weight of approximately 800, 25 parts by weight of methylene dianiline and 125 parts by weight of Carborundum filler, 60 mesh, Tyler standard screen scale. Although methylene dianiline was used as the curing agent, amines such as metaphenylene diamine could have been substituted therefor. Strong organic or inorganic acids also perform well as curing agents for the epoxy resin.

The electrode assembly 16 further includes a current electrode 38 and a potential electrode 40, each having the form of a band or ring, insulated from each other and from the pipe 22 by the layer of insulation 36. The current electrode 38 is imbedded in the layer of insulation 36 and disposed centrally with respect to the ends of the layer of insulation 36 and it is connected to the feed-through rod 28 by a first flat copper strip 42 which may be 0.10 inch thick, 3/16 inch wide and 23 inches long. The potential electrode 40 is imbedded in the layer of insulation 36 between the current electrode 38 and the lower end of the pipe 22 at a point preferably 18 inches from the current electrode 38 and it is connected to the feed-through rod 30 by a second flat copper strip 44 which may be 0.10 inch thick, 3/16 inch wide and 5 inches long. Each of the electrodes 38, 40 comprises layers of 16 mesh copper screen wire wrapped and bonded with the same resin, curing agent and filler used in the layer of insulation 36 described hereinabove.

The procedure for constructing the electrode assembly of this invention which has been very successfully used in logging while drilling apparatus is as follows:

(1) Using a wet lay-up process wrap a 1/16 inch layer of glass cloth with the resin mixture on the pipe 22 which preferably has an outside diameter of 7 1/4 inches.

(2) Place the first flat copper strip 42 longitudinally on the 1/16 inch layer of glass cloth and connect one end thereof to the current feed-through rod 28.

(3) Wrap a 1/16 inch layer of glass cloth with the resin mixture from the feed-through rod 28 over the first 1/16 inch layer of glass cloth and the first flat copper strip past the location of the potential electrode 40.

(4) Place the second flat copper strip 44 over the second 1/16 inch layer of glass cloth and connect one end thereof to the potential feed-through rod 30.

(5) Wrap a layer of glass cloth with the resin mixture to an outside diameter of approximately 7 7/8 inches leaving two two-inch wide spaces for the two copper screen electrodes 38 and 40.

(6) Solder each of the flat copper strips 42 and 44 to the width of the respective copper screens which comprise the electrodes 38, 40.

(7) Solder three bare tinned copper wires, each having preferably a 0.025 inch diameter and a 10 inch length about 120° apart to the bottom or first layer of the copper screens, feed the copper wires through each layer of screen, pull tight and solder to each layer as the screen is wrapped in the two-inch wide spaces provided in the glass cloth and brush in the resin mixture, build up the layers of the copper screen to an 8 inch outside diameter.

(8) Finish wrapping the glass cloth with the resin mixture, flush with the screen, that is, to an 8 inch outside diameter.

(9) Wrap the glass cloth and copper screens with cellophane tape.

(10) Allow the cellophane tape wrapped glass cloth and copper screens to stand at room temperature from 12 to 24 hours.

(11) Heat the assembly in an oven to 300° F. and hold it at that temperature for 6 hours.

(12) Heat it to 350° F. and hold it at that temperature for 2 hours.

(13) Allow it to cool slowly, that is, for several hours.

(14) Remove the cellophane tape.

Accordingly, an electrical logging electrode assembly of greater scrape resistance than heretofore known is provided for logging while drilling apparatus comprising the pipe 22, which is a portion of the drill stem 14, the two ring electrodes 38, 40 surrounding the pipe 22 and the abrasion resistant layer of insulation 36 disposed between the pipe 22 and the two ring electrodes 38, 40 to form three electrodes completely insulated from each other, two electrodes being the two copper screen electrodes, that is, the current electrode 38 and potential electrode 40, the third electrode being the pipe 22, which may conveniently be a common electrode.

Although the resin mixture has utility in an insulating layer for logging while drilling apparatus, it should be understood that the resin mixture of this invention has other applications.

Mud slurries in drilling operations are very abrasive and as a result the pumping and circulating of these slurries under high pressures and volume causes severe erosion of parts of conventional drilling equipment with which the slurries come into contact, for example, centrifuges or liquid cyclones which are used for desanding muds or recovering the barite weighting material therefrom.

The liquid cyclones have been rubber and porcelain lined to resist this erosion; yet in order to avoid rapid erosion of the cyclones it has been necessary to operate the cyclones at lower than optimum pressures and circulating rates.

In accordance with another aspect of this invention improved oil production apparatus which may be readily operated at optimum pressures and circulating rates is provided by applying to at least parts of the apparatus, such as cyclones, pump housings, pump impellers, valve seats and stems thereof a liner comprising the resin mixture of this invention, preferably 100 parts by weight of epoxy resin, 25 parts by weight curing agent and 60 to 400 parts by weight of Carborundum filler, as more fully described hereinabove in connection with the layer of insulation applied to the external surface of the logging while drilling apparatus.

Obviously, many modifications and variations of the invention as hereinabove set forth may be made without departing from the spirit and scope thereof and therefore only such limitations should be imposed as are indicated in the appended claims.

We claim:

1. Apparatus for use in an electrical well logging system comprising an electrical logging electrode assembly comprising a hollow metallic pipe, a layer of insulation applied to the external surface of said pipe, said layer of insulation comprising multiple layers of glass cloth bonded together and to said pipe by a polymerized epoxy resin matrix prepared from glycidyl polyether incorporating powdered silicon carbide in relative proportions of 60 to 400 parts by weight silicon carbide per 100 parts by weight epoxy resin, a first electrode imbedded in said layer of insulation and spaced from said pipe at a point substantially midway between the ends of said layer of insulation and a second electrode imbedded in said layer of insulation and spaced from said pipe between said first electrode and one end of said layer of insulation at a point substantially 18 inches from said first electrode.

2. In a system for conducting an electrical well log of the earth formations traversed by a borehole during the course of drilling the well comprising an electrical logging electrode assembly comprising a metallic drill pipe mounted in the drill string in the vicinity of the drill bit, the improvement wherein said electrode assembly comprises a layer of insulation applied to the external surface of said pipe, said layer comprising multiple layers of glass cloth bonded together and to said pipe by a polymerized epoxy resin prepared from glycidyl polyether incorporating powdered silicon carbide in relative proportions of 60 to 400 parts by weight silicon carbide per 100 parts by weight epoxy resin and first and second ring electrodes imbedded in said layer of insulation and spaced from said pipe and from each other, said ring electrodes comprising multiple layers of copper screen bonded together and to said layer of insulation by a polymerized epoxy resin matrix prepared from glycidyl polyether incorporating powdered silicon carbide in relative proportions of 60 to 400 parts by weight silicon carbide per 100 parts by weight epoxy resin.

3. In an electrical well logging system the improvement comprising an electrical logging electrode assembly comprising an insulator including a thermostable bonding material incorporating powdered silicon carbide and an electrode imbedded therein, said electrode comprising a plurality of electrically connected layers of metal screen.

4. In an electrical well logging system including a logging instrument the improvement comprising an electrical logging electrode assembly comprising an insulator including a thermostable bonding material and an electrode imbedded therein, said electrode comprising a plurality of electrically connected layers of metal screen.

5. In a system for conducting a well log of earth formations traversed by a borehole during the course of drilling the well, said system including an electrode assembly mounted to apparatus in the drill string in the vicinity of the drill bit for providing electrical contact between the electrical logging instrumentation and adjacent earth formations during the drilling operation, the improvement wherein the electrode assembly comprises an insulator including a thermostable bonding material incorporating silicon carbide and an electrode imbedded in said insulator.

6. In a system for conducting a well log of earth formations traversed by a borehole during the course of drilling the well, said system including an electrode assembly mounted to apparatus in the drill string in the vicinity of the drill bit for providing electrical contact between the electrical logging instrumentation and adjacent earth formations during the drilling operation, the improvement wherein the electrode assembly comprises an insulator including a thermostable bonding material incorporating powdered silicon carbide and an electrode imbedded therein, said electrode comprising a plurality of electrically connected layers of metal screen.

7. In a system for conducting a well log of earth formations traversed by a borehole during the course of drilling the well, said system including an electrode assembly mounted to apparatus in the drill string in the vicinity of the drill bit for providing electrical contact between the electrical logging instrumentation and adjacent earth formations during the drilling operation, the improvement wherein the electrode assembly comprises an insulator including a thermostable bonding material and an electrode imbedded therein, said electrode comprising a plurality of electrically connected layers of metal screen.

8. Apparatus as defined in claim 4 wherein said electrode comprises a plurality of layers of said metal screen positioned in overlapping relationship, each successive inner layer of said screen being imbedded deeper in said bonding material than an adjacent layer, and the outermost layer of said screen having an outer portion thereof exposed to provide electrical contact with material adjacent the electrode assembly.

9. Apparatus as defined in claim 8 wherein said successive layers of metal screen comprise overlapping layers of said screen disposed in a spiral configuration so that successive portions thereof are imbedded progressively deeper in said bonding material as the spiral progresses inwardly from said exposed outer portion of said screen.

10. Apparatus as defined in claim 8 wherein said electrical logging instrument comprises a metallic support and wherein said insulator further includes multiple layers of glass cloth interposed between said metallic support and said layers of metal screen.

11. Apparatus as defined in claim 8 wherein said thermostable bonding material comprises essentially a polymerized epoxy resin matrix.

12. Apparatus as defined in claim 11 wherein said bonding material further includes an abrasive-resistant filler having a hardness of the order of that of silicon carbide.

13. In an electrical system comprising an electrode assembly for electrically contacting adjacent material, the improvement wherein said electrode assembly includes an insulating bonding material and an electrode comprising a plurality of electrically connected layers of metal screen imbedded in said bonding material, said layers of screen being positioned in overlapping relationship, each successive inner layer of said screen being imbedded deeper in said bonding material than an adjacent layer, the outermost layer of said screen having an outer portion thereof exposed to provide electrical contact with material adjacent the electrode assembly.

14. Apparatus as defined in claim 13 wherein said successive layers of metal screen comprise overlapping layers of said screen disposed in a spiral configuration so that successive portions thereof are imbedded progressively deeper in said bonding material as the spiral progresses inwardly from said exposed outer portion of said screen.

15. Apparatus as defined in claim 13 wherein said insulating bonding material comprises essentially polymerized epoxy resin matrix with an abrasive-resistant filler having a hardness of the order of that of silicon carbide.

References Cited in the file of this patent

UNITED STATES PATENTS

| | | |
|---|---|---|
| 2,370,818 | Silverman | Mar. 6, 1945 |
| 2,400,170 | Silverman | May 14, 1946 |
| 2,524,031 | Arps | Oct. 3, 1950 |
| 2,528,933 | Wiles | Nov. 7, 1950 |
| 2,658,849 | Lew | Nov. 10, 1953 |
| 2,735,829 | Wiles | Feb. 21, 1956 |
| 2,743,207 | Rusch | Apr. 24, 1956 |
| 2,768,992 | Zukas | Oct. 30, 1956 |
| 2,773,048 | Formo et al. | Dec. 4, 1956 |
| 2,779,915 | Moon | Jan. 29, 1957 |